(12) United States Patent
Frank et al.

(10) Patent No.: US 9,798,901 B2
(45) Date of Patent: Oct. 24, 2017

(54) DEVICE HAVING A SECURITY MODULE

(71) Applicants: Juergen Frank, Munich (DE); Michael Staudenmaier, Munich (DE); Manfred Thanner, Neubiberg (DE)

(72) Inventors: Juergen Frank, Munich (DE); Michael Staudenmaier, Munich (DE); Manfred Thanner, Neubiberg (DE)

(73) Assignee: NXP USA, Inc., Austin, TX (US)

( * ) Notice: Subject to any disclaimer, the term of this patent is extended or adjusted under 35 U.S.C. 154(b) by 126 days.

(21) Appl. No.: 14/786,558

(22) PCT Filed: Apr. 30, 2013

(86) PCT No.: PCT/IB2013/053400
§ 371 (c)(1),
(2) Date: Oct. 23, 2015

(87) PCT Pub. No.: WO2014/177905
PCT Pub. Date: Nov. 6, 2014

(65) Prior Publication Data
US 2016/0078253 A1 Mar. 17, 2016

(51) Int. Cl.
*H04L 29/00* (2006.01)
*G06F 21/79* (2013.01)
*G06F 21/85* (2013.01)
*G06F 12/14* (2006.01)
*G06F 12/02* (2006.01)

(52) U.S. Cl.
CPC .......... *G06F 21/79* (2013.01); *G06F 12/1408* (2013.01); *G06F 21/85* (2013.01); *G06F 12/0223* (2013.01); *G06F 2212/1052* (2013.01)

(58) Field of Classification Search
CPC ............................. G06F 21/79; G06F 12/1408
USPC ........................................................... 726/26
See application file for complete search history.

(56) References Cited

U.S. PATENT DOCUMENTS

| | | | |
|---|---|---|---|
| 6,480,941 B1 * | 11/2002 | Franke | G06F 12/0284 710/317 |
| 7,987,356 B2 | 7/2011 | Buer | |
| 2003/0200448 A1 | 10/2003 | Foster et al. | |
| 2003/0200451 A1 | 10/2003 | Evans et al. | |
| 2003/0200453 A1 | 10/2003 | Foster et al. | |
| 2003/0200454 A1 | 10/2003 | Foster et al. | |

(Continued)

OTHER PUBLICATIONS

International Search Report and Written Opinion correlating to PCT/IB2013/053400 dated Jan. 29, 2014.

*Primary Examiner* — Anthony Brown
*Assistant Examiner* — Michael D Anderson

(57) ABSTRACT

A device securely accesses data in a memory via an addressing unit which provides a memory interface for interfacing to a memory, a core interface for interfacing to a core processor and a first and second security interface. The device includes a security processor HSM for performing at least one security operation on the data and a remapping unit MMAP. The remapping unit enables the security processor to be accessed by the core processor via the first security interface and to access the memory device via the second security interface according to a remapping structure for making accessible processed data based on memory data. The device provides a clear view on encrypted memory data without requiring system memory for storing the clear data.

19 Claims, 6 Drawing Sheets

(56) References Cited

U.S. PATENT DOCUMENTS

| | | |
|---|---|---|
| 2005/0177650 A1 | 8/2005 | Arndt et al. |
| 2007/0042769 A1 | 2/2007 | Thommana et al. |
| 2008/0189560 A1* | 8/2008 | Case .................. G06F 12/1458 |
| | | 713/193 |

* cited by examiner

DEVICE HAVING A SECURITY MODULE

FIELD OF THE INVENTION

This invention relates to a device having a hardware security module and a method for secure data processing.

BACKGROUND OF THE INVENTION

United States patent application US2003/0200448 describes an example of an integrated device coupled to a non-volatile memory for securely storing data. The device comprises a processor and an access control unit, the access control unit having a memory interface to the memory and a processor interface to the processor. Various security functions are implemented in the access unit, such as an encryption and decryption function. The processor has a data cache and an instruction cache for storing clear data. When the processor writes clear data to the cache, such data has to be stored in encrypted form in the non-volatile memory later. In the later write process, clear data is read from the cache and transferred to the access control unit via the processor interface. The access unit subsequently performs data encryption, and the writes the encrypted data to a secure memory region in the memory via the memory interface.

SUMMARY OF THE INVENTION

In the above system, the access control unit is positioned between the processor and the memory. The processor is directly connected to the access control unit, and cannot access the memory otherwise. Moreover, any encrypted data in the external memory must be transferred via the access control unit to the cache memories of the processor and vice versa. The system is not flexible and requires a data cache memory at the processor.

The present invention provides a processor device, and a method, as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Examples of the present invention will now be described with reference to an example of a hardware security processor for accessing secure data. It is noted that such a processor may be part of a larger processing system or dedicated secure controller, or any other secure data storage system. So it will be appreciated that the present invention is not limited to the specific processing architecture herein described with reference to the accompanying drawings, and may equally be applied to alternative architectures.

Figure 1:
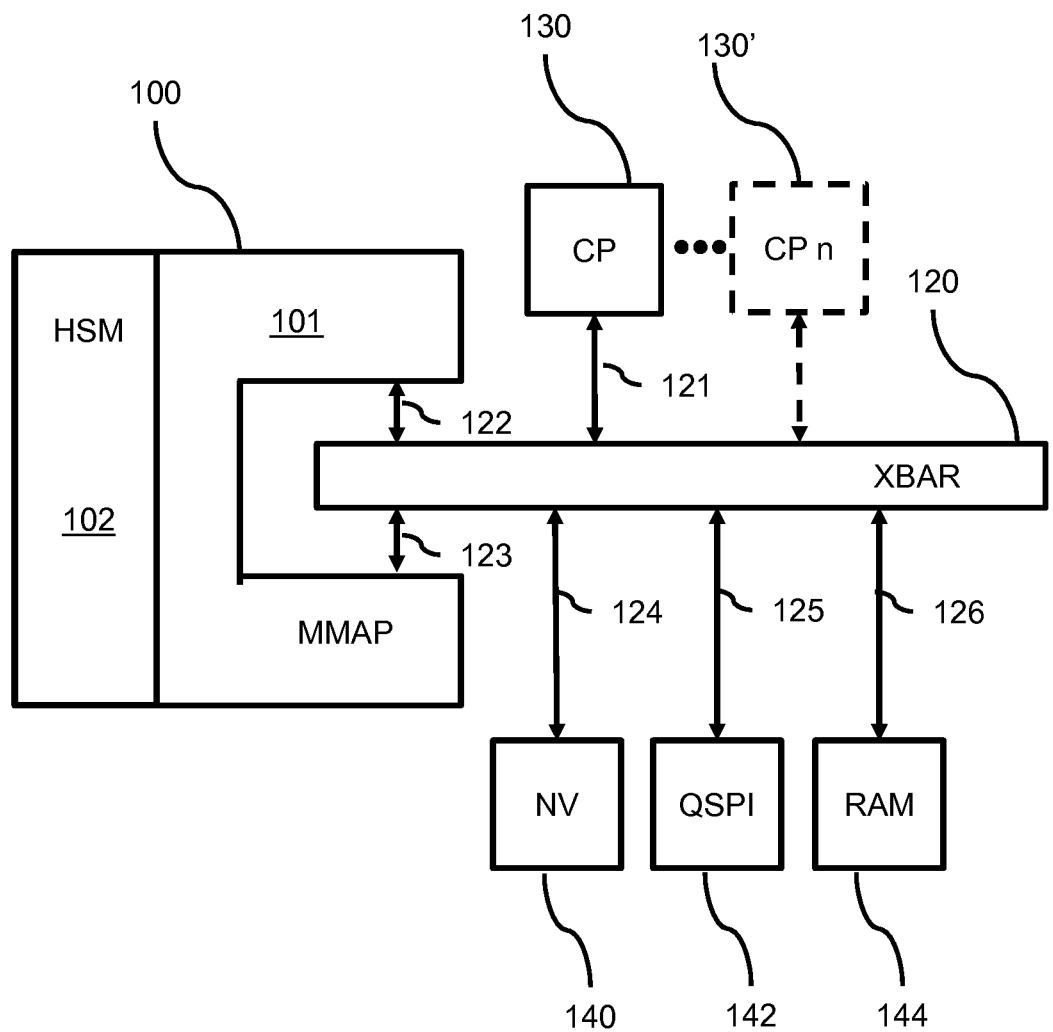
FIG. 1 shows an example of a device for securely accessing data in a memory via an addressing unit.

FIG. 1 shows an example of a device for securely accessing data in a memory via an addressing unit. The device 100 comprises a security processor 102 for performing at least one security operation on the data. In the examples, the security processor may be called hardware security module (HSM).

The figure shows the device 100 coupled to an addressing unit 120, for addressing multiple memory type devices, usually called a cross bar switch (XBAR), having multiple interfaces for data and addresses. A crossbar switch is an assembly of individual switches between multiple inputs and multiple outputs. The switches are arranged in a matrix. If the crossbar switch has M inputs and N outputs, then a crossbar has a matrix with M×N cross-points or places where the "bars" cross. At each cross-point is a switch; when closed, it connects one of M inputs to one of N outputs. The addressing unit is further elucidated with reference to FIG. 6 below. The addressing unit has a core interface 121 for interfacing to a core processor CP 130 for enabling the core processor to access the memory. Further core processors 130' may also use the core interface, in practice the system can have more than one CP. A CP may comprise a core, DMA, Peripheral Interfaces like an Ethernet or FlexRay controller or an dedicated security module. The core processor may also be called master processor or central processing unit (CPU), and indicates any processor, e.g. a DMA controller or intelligent communication master like an Ethernet controller, that is provided for performing main tasks in a processing system, in particular initialize a data transfer or security function via the security processor.

The addressing unit 120 has one or more memory interfaces for interfacing to respective memory units or memory mapped peripheral units. In the example a first memory interface 124 is coupled to a non-volatile memory NV 140, for example a flash type memory, and a second memory interface 126 is coupled to random access memory RAM 144. A further memory interface 125 is coupled to a serial parallel unit QSPI 142 for interfacing to external peripherals via a serial bus. A common type of such serial bus is called SPI, or Serial Peripheral Interface Bus, which is a synchronous serial data link standard, named so by Motorola, that operates in full duplex mode. Devices communicate in master/slave mode where the master device initiates the data frame. Multiple slave devices are allowed with individual slave select (chip select) lines. Sometimes SPI is called a four-wire serial bus, contrasting with three-, two-, and one-wire serial buses. SPI is often referred to as SSI (Synchronous Serial Interface). The queued serial peripheral interface (QSPI) 142 as shown is a type of SPI controller. It uses a data queue with programmable queue pointers allowing data transfers without CPU intervention. It is noted that the QSPI is only an example of a peripheral system with a memory interface; similar alternatives include DDR-RAM, I2C flash, etc. Consequently, the peripherals appear to the CPU as memory-mapped parallel devices.

Also, the addressing unit has a first security interface 123 and a second security interface 122 for interfacing to the security processor 100, the first interface 123 being a slave and the second interface 122 being a master interface on the crossbar. The interfaces as such are not secure, and are like other interfaces on the crossbar. The first security interface 123 is intended to provide a view on the memory, as indicated by the text HSM_MV. The second security interface enables the security processor to access any of the other interfaces, in particular the memory interfaces, via the addressing unit.

The device 100 further has a memory remapping unit 101 for enabling being accessed by the core processor via the first security interface and accessing the memory device via the second security interface according to a remapping structure for making accessible processed data based on memory data. For example, the device may provide, to the core processor, a virtual clear view on the data stored in the memory by performing encryption and/or decryption operations on the data that is transferred between the core processor and the memory via the security processor 100. Thereto the remapping structure has to be configured accordingly.

Figure 2:
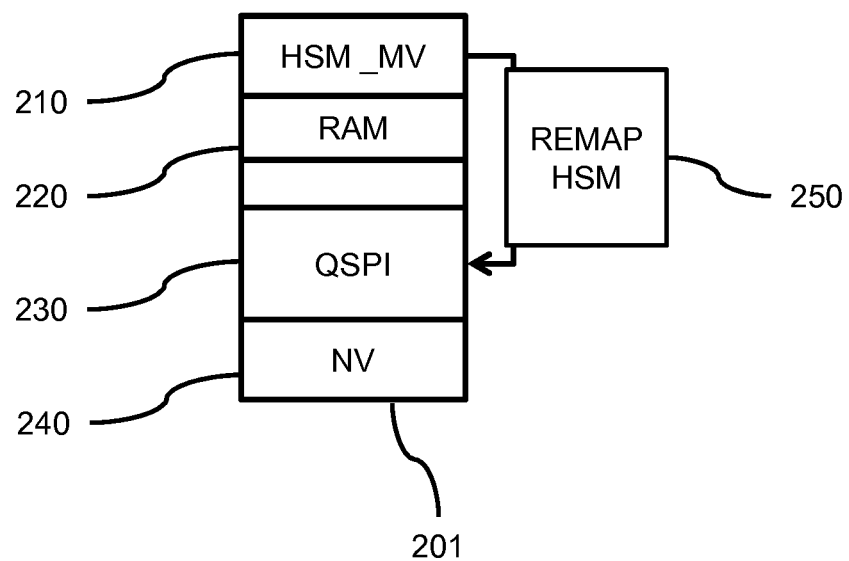
FIG. 2 shows an example of a remapping structure.

FIG. 2 shows an example of a remapping structure. A remapping structure 200 is schematically indicated by a system memory map 201 and remapping information 250 marked REMAP HSM to indicate that the hardware secure module is included in the remapping structure for performing a selected security operation. The memory map has a first memory area 210 assigned to the first security interface to establish a window of a selected size for providing a hardware security module based memory view (HSM_MV). The parameters of the window are elucidated below. The remapping information 250 further defines that said window corresponds to a further memory area 230 assigned to the memory interface for the QSPI. Furthermore the memory map has a further memory area 220 assigned to the RAM memory and a memory area 240 assigned to the NV memory.

Figure 3:
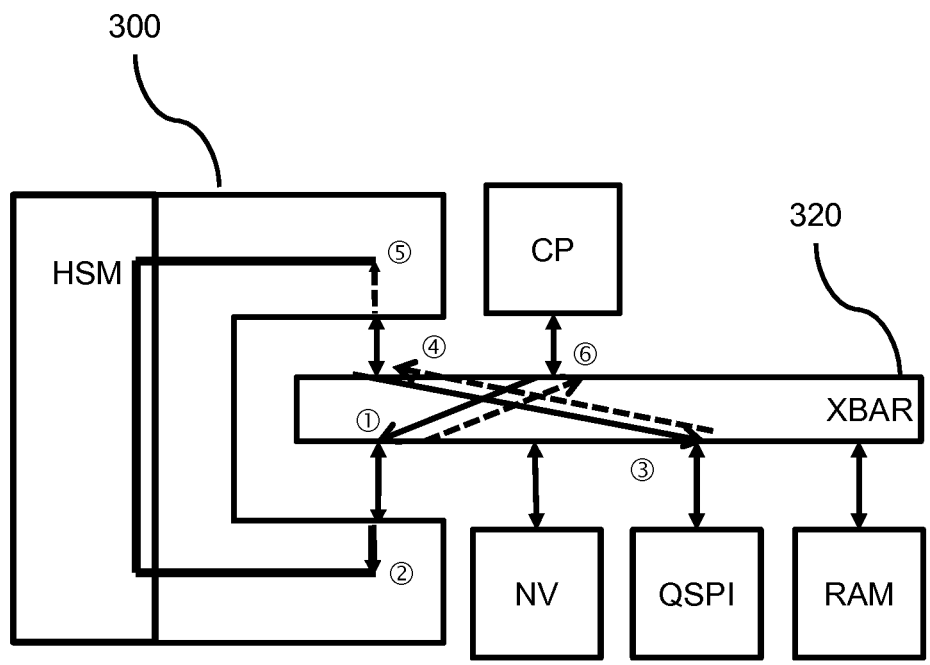
FIG. 3 shows an example of a system securely accessing data.

FIG. 3 shows an example of a system securely accessing data. The device 300 coupled to the addressing unit 320 correspond to the device 100 and addressing unit 120 as described above with reference to FIG. 1. The device is further coupled to similar other devices and components as described above. In the Figure, the operation of the memory mapping while including the security processor is illustrated by six arrows marked ① to ⑥, arrows ① to ③ from the CP to QSPI being solid, and arrows ④ to ⑥ from the QSPI to CP being dashed. The remapping structure is assumed to be configured accordingly for assigning the address ranges, and windows, and security modes as required.

The first arrow indicates that the core processor executes an initial memory access, which is addressed at the memory address range assigned to the first security interface. The memory access is remapped by the remapping unit so as to access again the addressing unit, via the second security interface, as indicated by the second arrow. The second arrow continues via the security module so as to indicate performing the security operation such as encryption on the data from the core processor during writing data (or later on the memory data during reading). The now encrypted data is provided via the second memory interface via the addressing unit to the QSPI memory address as indicated by the third arrow. Vice versa, when data is read by the core processor, the address is effectively remapped for reading the QSPI memory address, and the data is first transferred to the second security interface as indicated by the fourth arrow. Subsequently, the still encode memory data is transferred in the device 300 via the security processor as indicated by the fifth arrow so as to decrypt the memory data and then forward the decrypted data (so called processed data) to the first security interface. Finally, as indicated by the sixth arrow, the now clear data is transferred to the core processor via the first security interface. Hence the processor may access any encrypted data in the memory as if such data is available in clear, after properly configuring the remapping structure. It is noted, in practice, some delay will occur due to the security operation. In an embodiment the device is arranged to receive, as part of the remapping structure, a read unit size and/or pre-fetch amount so as to be able to read and securely process data before the core processor actually addresses the corresponding location. For writing data also a buffer may be provided so that the core processor may not need kept waiting until the security operation and subsequent writing has been performed. Furthermore, other security function may be selected that do not change the data as such, e.g. calculating an authentication code. For such security modes, the memory data may be made available via the addressing unit simultaneously to the core processor and the security processor. Various possible configurations and operational modes are described now.

Optionally, the device is arranged for receiving a remapping command from the core processor for setting at least part of the remapping structure. The remapping command is indicative for the device to set or modify the remapping structure. Also, the security processor may be arranged for receiving a security command from the core processor for setting the security operation. The security command is indicative of the secure function that the core processor wants to have executed, e.g. decoding encrypted data. The commands may be transferred via the access unit on a specific command address of the device, or via a separate command interface between the core processor and the device. So, optionally, the device is arranged for receiving the commands from the core processor via the first security interface.

In the commands, in particular remapping commands or data transfer commands, various parameters of the remapping structure may be included. The device may be arranged for receiving, via the command, at least one of a source address, a destination address, a window size, a security mode, and/or a key. Such key data may include the key as such, a key identifier, and/or other encryption and/or encoding parameters, as required for the selected security operation.

Optionally, the memory remapping unit is arranged for providing a data cache for the core processor. The data cache may be provided automatically, for example for writing data to the memory after encryption, or still processing read data while the read data is already transferred to the core processor. Furthermore, the memory remapping unit may be arranged for receiving, via the command, at least one of a cache start address, a cache end address, a cache size. This enables the core processor to set the cache so as to enhance the performance according to the actual processing conditions.

Optionally, the remapping unit is arranged for, according to the remapping structure, providing a memory window. The memory window is provided at a window address to the core processor via the first security interface. Furthermore, the processed data is made accessible within the memory window based on accessing, via the second security interface, the memory data at a target address. So when data is to be read from the window at a specified window address, the address is converted, i.e. remapped, to a different target address in the memory. The data read from the memory at the target address may be processed by a security function and subsequently modified to be provided at the memory address, as processed data. Alternatively, the secure processing may not require modifying the data, e.g. only calculating a checksum. In that case the memory data itself may be immediately forwarded to the memory window.

In an embodiment, the remapping unit is arranged for a read sequence as follows, according to the remapping structure. First the remapping unit is being accessed via the first security interface at a first address. A second address is then determined at the second security interface, and access is provided to the memory data at the second address as the processed data for the core processor via a data bus. The security processor is further arranged for reading the data bus and performing at least one security operation on the memory data. So the processed data is equal to the memory data, e.g. while calculating an authentication code. A further read sequence may be as follows, again when so configured according to the remapping structure. First the remapping unit is being accessed via the first security interface at a first address, and a second address for the memory device is determined based thereon. The memory data is read at the second address via the second security interface, and the processed data is provided via the first security interface for the core processor. In this sequence, the security processor is arranged for performing at least one security operation on the memory data as read for generating the processed data. So the processed data is different from the memory data, e.g. decrypted.

In an embodiment, the remapping unit is arranged for a write sequence as follows, according to the remapping structure. First the remapping unit is being accessed via the first security interface at a first address. Then core data from the core processor is received via the first security interface. A second address for the memory device is determined by conversion according to the memory structure, and the memory data is written at the second address via the second security interface. In parallel, the security processor is arranged for performing at least one security operation on the core data as received for generating the memory data. So the memory data is different from the core data, e.g. encrypted. A further write sequence may be as follows, again when so configured according to the remapping structure. Core data is received from the core processor via the first security interface, and a second address for the memory device is determined. The core data is written, as the memory data, at the second address via the second security interface, while the security processor is arranged for performing at least one security operation on the core data. So the memory data is equal to the core data, e.g. while calculating an authentication code.

Optionally, the security processor is arranged for, as the security operation, encrypting and/or decrypting data. The security processor may also be arranged for, as the security operation, determining an authentication code based on the data. In an embodiment, the security processor is arranged for determining an authentication code by determining a Cipher based Message Authentication Code (CMAC) and/or HASH code. Such codes are known as such, and may be defined in security standards. Effectively such codes are calculated while reading and/or writing data from/to the memory. Optionally, that data may be transferred to the security processor at the same time as transferring the data to the core processor via the remapping unit.

In practice, in the area of automotive applications, there is a need for semiconductor processing devices with a hardware security module. The hardware security module may provide secure storage and a crypto acceleration unit. One typical use-case is to decode and encode data or program code from one memory location (e.g. RAM or FLASH) to the system RAM. This approach with a traditional security module requires the RAM array. The above described remapping feature combined with a HSM is able to solve use-case this with less RAM. For example, data fetching and HASH/CMAC-calculation may be performed "in parallel". Due the remapping the HSM may provide a "plaintext" view on encrypted data, and may control the "plaintext" view depending of the system status/tampering. A bus master may read from an address area which is under the control by the HSM. The HSM will re-route this read-request to another memory area (e.g. flash, SRAM, message buffers) which re-routing is configurable. Data will be decoded or encoded before being offered as response to the bus master. Data may also be transferred via the remapping unit to the HSM and used for a CMAC calculation.

Using a traditional security module, a sequence for accessing encoded data may be as follows. First the HSM is set up for encoding data by setting parameters such as source, destination, length, mode & key. Then the HSM reads all data and stores them into the SRAM, for example 8 k Bytes of data from the external memory for encoding requires also 8 kBytes SRAM space in the system. Also, the core processor will have to wait, e.g. on a HSM interrupt, until accessing the decoded data.

Using the remapping device enables the sequence is as follows. First the remapping structure is set up, e.g. the memory window by defining source, destination, length, mode & key. The data is read by the core processor via the security processor as enabled by the remapping unit. The HSM may have some reserve memory, e.g. having length size (min 16 bytes plus context info). The HSM may decode the requested data and offer it to the core. It is noted that less memory resources are required, while the HSM internal memory may be (re-)used.

Using a traditional security module, a sequence for calculating an authentication code such as CMAC on message data may be as follows. First the HSM is set up for processing an amount of data by defining source, destination, length & key. Then the HSM reads all message data and calculates the CMAC. The core processor also reads the message data and writes the data into message buffer. Finally the CMAC is attached by core Using the remapping device enables the sequence for calculating an authentication code is as follows. First the remapping structure is set up, e.g. the memory window by defining source, destination, length, mode & key. Then the core reads all message data via the remapping unit coupled to the HSM, and simultaneously the HSM will use the data for the CMAC calculation. Finally the CMAC is attached to the message by the core processor. Hence the message data is only read once.

In a practical example in a car processing system, an Instrument cluster or infotainment unit has lots of graphical objects stored in memory. Often these objects are specific and represent product look-and-feel. These elements may be protected with cryptographic functions. To use or display the elements must be decoded. Traditionally such element were copied into the SRAM and decoded, so more SRAM was needed for the copy in SRAM. Optionally, the device may be arranged to detect whether a debugger is connected to the system. The security processor may be arranged to react on such event, e.g. by disabling any plaintext view on stored, encrypted data.

Figure 4:
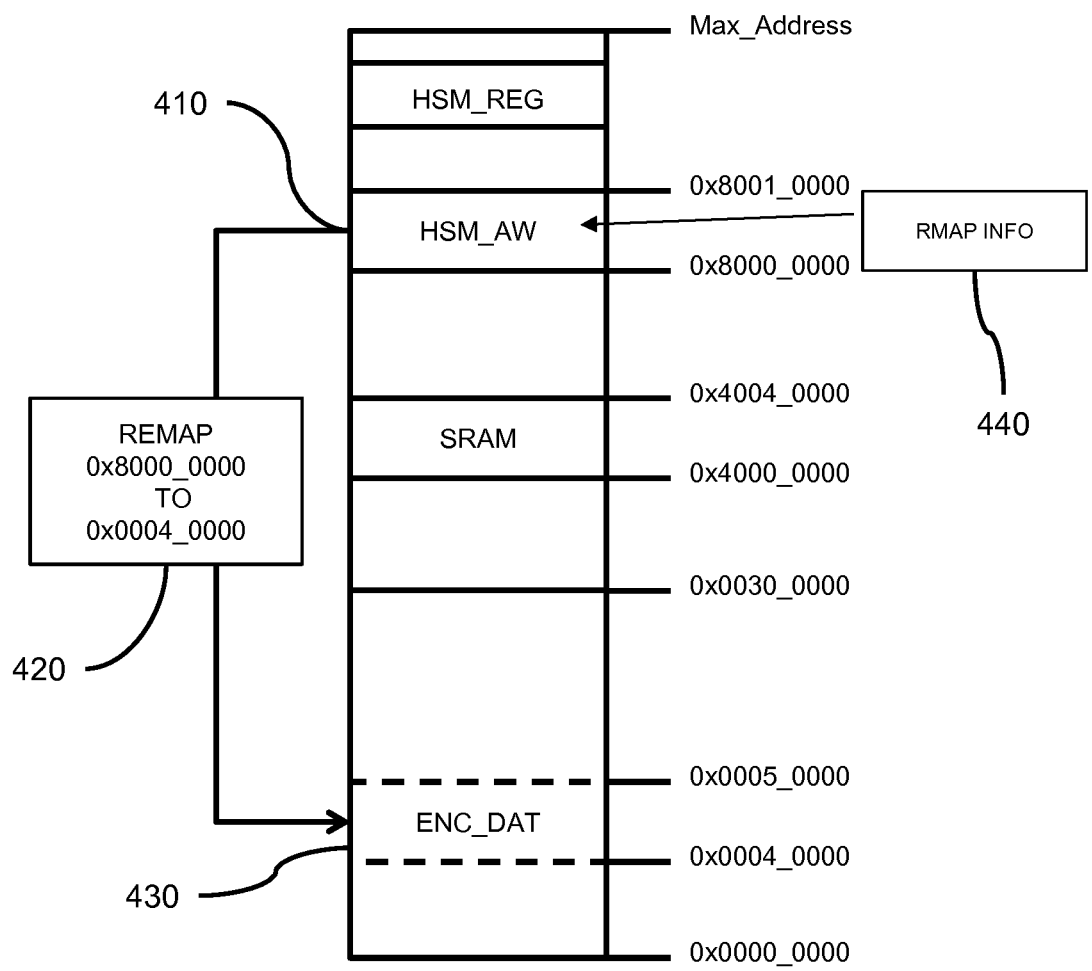
FIG. 4 shows an example of a remapping structure in a memory map.

FIG. 4 shows an example of a remapping structure in a memory map. In the example the memory map 400 has an address range denoted in hexadecimal notation from 0x0000_0000 up to Max_Address, while several address ranges are marked by respective start and/or end addresses. In a first address range ENC_DAT 430 from 0x0004_0000 up to 0x0005_0000 (256 KByte) encoded memory data is stored, e.g. as part of a larger memory area up to 0x0030_0000 (3 MByte). In a second range from 0x4000_0000 to 0x4004_0000 the SRAM is located. In a third range from 0x8000_0000 to 0x8001_0000 there is located an address window 410 of the HSM called HSM_AW. By providing remapping information RMAP INFO 440 the base address and size of the address window have been configured previously. In some higher address range a set of registers for controlling and/or setting up the security processor and/or remapping are provided, as indicated by HSM_REG. By writing to the memory addresses control data and/or commands are transferred to the security processor.

In operation, the customer program will first setup the HSM Address Window HSM_AW with, for example, the following parameters: base address, size, destination address, cipher key reference, and cipher modes (e.g. EBC, CBC, CTR etc.) and algorithms (e.g. AES-128/256, 3DES etc.). Any access into the specified address window HSM_AW will be translated via the remapping unit into the corresponding address range of the encoded data (ENC_DAT), as indicated by the remapping structure 420. So the following address conversion is generated:

```
0x8000_0000 > 0x0004_0000
0x8000_0004 > 0x0004_0004
0x8000_0008 > 0x0004_0008
       . . .
```

The HSM will the received data from encoded memory ENC_DAT and decode the data based on the key, cipher & cipher mode which have been setup by the RMAP INFO 440.

Figure 5:
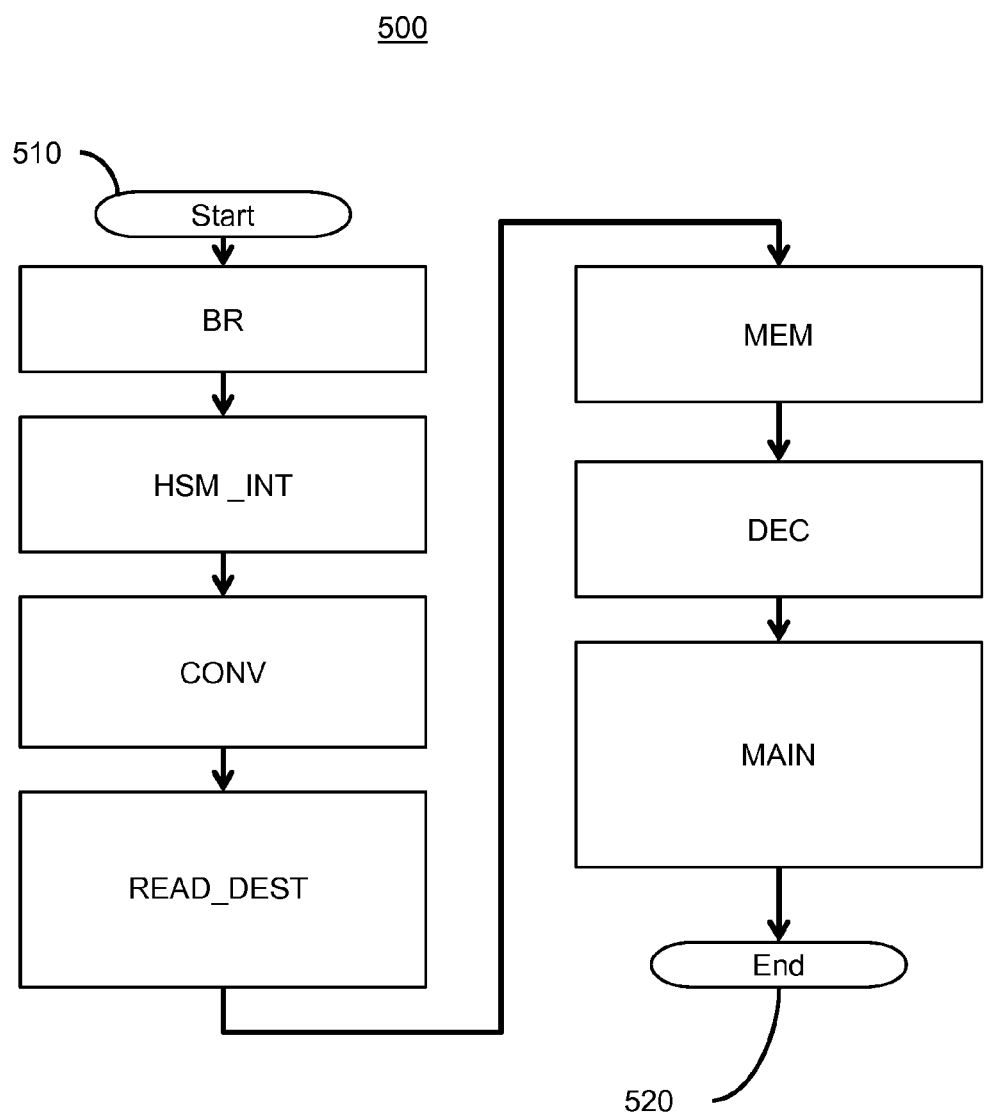
FIG. 5 shows a method of reading encrypted data, and FIG. 6 show an example of parallel bus access.

FIG. 5 shows a method of reading encrypted data. The method 500 of reading encrypted data starts at step START 510. In a first step BR a bus master (e.g. a core processor) reads from HSM window. Then, the HSM core receives an interrupt, triggered due the read in the HSM window in step HSM_INT. In a next step CONV, based on the window configuration and the actual transfer the remapping unit converts the address to the destination. In a next step READ_DEST, based on the converted address, data is read from the destination address. In a next step, MEM, the final destination (in this example a flash memory) will send the encrypted data value back to the HSM. In a next step DEC the HSM will decode the memory data value and offer the decoded data as read value to the initial bus master. Finally, in a next step MAIN, the Bus master can work with the encoded data. Bus master requires no knowledge about cipher, keys etc. All remapping and decoding is managed by the HSM transparently. The method ends at step END 520.

Figure 6:
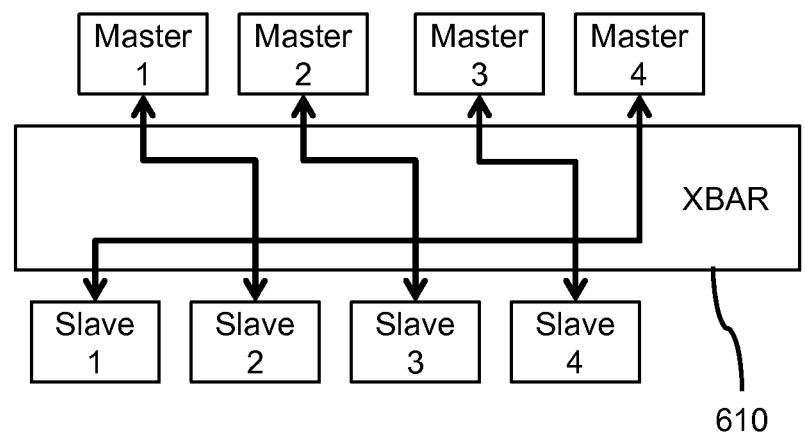

FIG. 6 show an example of parallel bus access. The Figure shows an addressing unit providing a crossbar bus XBAR 610 connecting master and slave devices. A master is any module or device which is able to initiate a bus access like a core processor, a DMA engine or an interface controller (e.g. Ethernet, FlexRay). A slave is any module or device which is able to receive a bus access from a master. The crossbar bus in the block diagram shows a communication scheme between four masters, marked MASTER 1, MASTER 2, MASTER 3 and MASTER 4, and four slaves, marked SLAVE 1, SLAVE 2, SLAVE 3 and SLAVE 4. None of the four communication paths interferes with the others. So the masters and corresponding slaves are connected in parallel. The security device as described above comprises the security processor and the remapping unit, the remapping unit providing a slave for the core processor (one master-slave pair) and master for the external memory (another master-slave pair). So the addressing unit 610 enables multiple and parallel transfers between different master-slave combination, while a single module may be master and slave on the same bus.

In a practical system, the method may be implemented in a processor system, or in a software program for a secure processor. Such a computer program product has the instructions for causing a processor system to perform a method of securely accessing data as described above.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. Device for securely accessing data in a memory via an addressing unit comprising:
   at least one memory interface for interfacing to at least one memory device;
   a core interface for interfacing to a core processor for enabling the core processor to access the memory;
   a first security interface and a second security interface for interfacing to a security processor;
   the security processor for performing at least one security operation on the data, and
   a remapping unit for enabling the security processor to be accessed by the core processor via the first security interface and to access the memory device via the second security interface according to a remapping structure for making accessible processed data based on memory data, wherein the processed data is transferred to the core processor from the memory device by the security processor via the first security interface.

2. Device as claimed in claim 1, wherein the device is arranged for receiving a remapping command from the core processor for setting at least part of the remapping structure.

3. Device as claimed in claim 1, wherein the security processor is arranged for receiving a security command from the core processor for setting the security operation.

4. Device as claimed in claim 2, wherein the device is arranged for receiving the commands from the core processor via the first security interface.

5. Device as claimed in claim 2, wherein the device is arranged for receiving, via the command, at least one of
   a source address,
   a destination address,
   a window size,
   a security mode, and
   a key.

6. Device as claimed in claim 1, wherein the remapping unit is arranged for providing a data cache for the core processor.

7. Device as claimed in claim 6, wherein the remapping unit is arranged for receiving, via the command, at least one of
   a cache start address,
   a cache end address, and
   a cache size.

8. Device as claimed in claim 1, wherein the remapping unit is arranged for, according to the remapping structure, providing a memory window at a window address to the core processor via the first security interface and making accessible the processed data within the memory window based on accessing, via the second security interface, the memory data at a target address.

9. Device as claimed in claim 1, wherein the remapping unit is arranged for, according to the remapping structure, when being accessed via the first security interface at a first address,
   determining a second address at the second security interface,
   providing access to the memory data at the second address as the processed data for the core processor via a data bus,
and the security processor is arranged for reading the data bus and performing at least one security operation on the memory data.

10. Device as claimed in claim 1, wherein the remapping unit is arranged for, according to the remapping structure, when being accessed via the first security interface at a first address,
   determining a second address for the memory device,
   reading the memory data at the second address via the second security interface, and
   providing the processed data via the first security interface for the core processor,
and the security processor is arranged for
   performing at least one security operation on the memory data as read for generating the processed data.

11. Device as claimed in claim 1, wherein the remapping unit is arranged for, according to the remapping structure, when being accessed via the first security interface at a first address,
   receiving core data from the core processor via the first security interface, and
   determining a second address for the memory device,
   writing the memory data at the second address via the second security interface
and the security processor is arranged for
   performing at least one security operation on the core data as received for generating the memory data.

12. Device as claimed in claim 1, wherein the remapping unit is arranged for, according to the remapping structure, when being accessed via the first security interface at a first address,
   receiving core data from the core processor via the first security interface, and
   determining a second address for the memory device,
   writing the core data at the second address via the second security interface and the security processor is arranged for
   performing at least one security operation on the core data as received.

13. Device as claimed in claim 1, wherein the security processor is arranged for, as the security operation, at least one of encrypting and decrypting data.

14. Device as claimed in claim 1, wherein the security processor is arranged for, as the security operation, determining an authentication code based on the data.

15. Device as claimed in claim 14, wherein the security processor is arranged for determining an authentication code by determining at least one of a Cipher based Message Authentication Code and a HASH code.

16. An integrated circuit comprising at least one device according to claim 1.

17. Method of securely accessing data in a memory, the method comprising:
   performing, in a security processor, at least one security operation on the data;
   addressing multiple interfaces comprising
      at least one memory interface for interfacing to at least one memory device,
      a core interface for interfacing to a core processor for enabling the core processor to access the memory,
      a first security interface and a second security interface for interfacing to the security processor,
   the method further comprising:
      remapping for enabling the security processor to be accessed via the first security interface and to access the memory device via the second security interface according to a remapping structure for making accessible processed data based on memory data, wherein the processed data is transferred to the core processor from the memory device by the security processor via the first security interface.

18. Method as claimed in claim 17, the method further comprising:
  receiving a remapping command for setting at least part of the remapping structure, or
  receiving a security command for setting the security operation.

19. Method as claimed in claim 18, the method further comprising the step of receiving, via the command, at least one of
  a source address,
  a destination address,
  a window size,
  a security mode, and
  a key.

\* \* \* \* \*